US006986842B2

(12) United States Patent  
Bortnik et al.

(10) Patent No.: US 6,986,842 B2  
(45) Date of Patent: Jan. 17, 2006

(54) FILTER ELEMENT WITH FOAM GIRDLE TO SECURE PLEATS AND METHOD OF FORMING SAME

(75) Inventors: Christopher B. Bortnik, Warrendale, PA (US); Alexander Kiderman, Pittsburgh, PA (US)

(73) Assignee: Schroeder Industries, LLC, Leetsdale, PA (US)

( * ) Notice: Subject to any disclaimer, the term of this patent is extended or adjusted under 35 U.S.C. 154(b) by 30 days.

(21) Appl. No.: 11/043,904

(22) Filed: Jan. 26, 2005

(65) Prior Publication Data

US 2005/0211619 A1  Sep. 29, 2005

Related U.S. Application Data

(63) Continuation-in-part of application No. 10/257,171, filed on Oct. 9, 2002, now abandoned.

(60) Provisional application No. 60/203,553, filed on May 11, 2000.

(51) Int. Cl.
*B01D 27/06* (2006.01)

(52) U.S. Cl. .................. 210/232; 210/350; 210/455; 210/457; 210/484; 210/485; 210/487; 210/489; 210/493.5; 210/497.01; 210/315

(58) Field of Classification Search ............. 210/232, 210/315, 350, 455, 457, 470, 483, 484, 485, 210/487, 488, 489, 493.1, 493.5, 496, 497.01

See application file for complete search history.

(56) References Cited

U.S. PATENT DOCUMENTS

| | | | |
|---|---|---|---|
| 2,801,009 A * | 7/1957 | Bowers | 210/493.4 |
| 3,115,459 A * | 12/1963 | Giesse | 210/484 |
| 3,290,870 A | 12/1966 | Jensen | |
| 3,334,752 A * | 8/1967 | Matravers | 210/457 |
| 3,361,260 A * | 1/1968 | Buckman | 210/130 |
| 3,368,687 A * | 2/1968 | Ruschman | 210/457 |
| 3,370,708 A * | 2/1968 | Hultgren et al. | 210/130 |
| 3,390,780 A * | 7/1968 | Bennett | 210/338 |
| 3,397,796 A * | 8/1968 | MacDonnell | 210/457 |
| 3,498,464 A * | 3/1970 | Enosolone | 210/457 |
| 3,552,553 A * | 1/1971 | Reading | 210/484 |
| 3,656,627 A * | 4/1972 | Briggs | 210/315 |
| 3,766,629 A | 10/1973 | Lechtenberg | |
| 3,827,566 A * | 8/1974 | Ponce | 210/338 |
| 3,867,294 A * | 2/1975 | Pall et al. | 210/489 |
| 4,186,099 A * | 1/1980 | Henschel et al. | 210/457 |
| 4,419,241 A * | 12/1983 | Hoffmann | 210/493.5 |
| 4,695,300 A | 9/1987 | Takagi | |
| 5,858,044 A | 1/1999 | Nepsund et al. | |
| 5,871,641 A * | 2/1999 | Davidson | 210/193 |
| 5,882,528 A * | 3/1999 | Davidson | 210/777 |
| 5,980,759 A * | 11/1999 | Proulx et al. | 210/767 |
| 6,569,330 B1 * | 5/2003 | Sprenger et al. | 210/315 |
| 2003/0047503 A1 | 3/2003 | Bortnik et al. | |

* cited by examiner

*Primary Examiner*—Robert James Popovics

(74) *Attorney, Agent, or Firm*—Blynn L. Shideler

(57) ABSTRACT

A fluid filter element (10) comprises a pleated filter media (34) having spaced apart pleats (40) and an external filter media surface (38) comprising the external peaks of the pleats (40) and a flexible foam filter media sleeve (42) in contact with and extending between the pleats of the peaks of the external filter media surface (38). The filter media sleeve (42) maintains the spacing between the external peaks of the pleats (40) of the pleated filter media (34). The pleated filter media (34) is for fluid applications and includes fragile material media layers (74, 76) between wire meshes (70, 80).

20 Claims, 3 Drawing Sheets

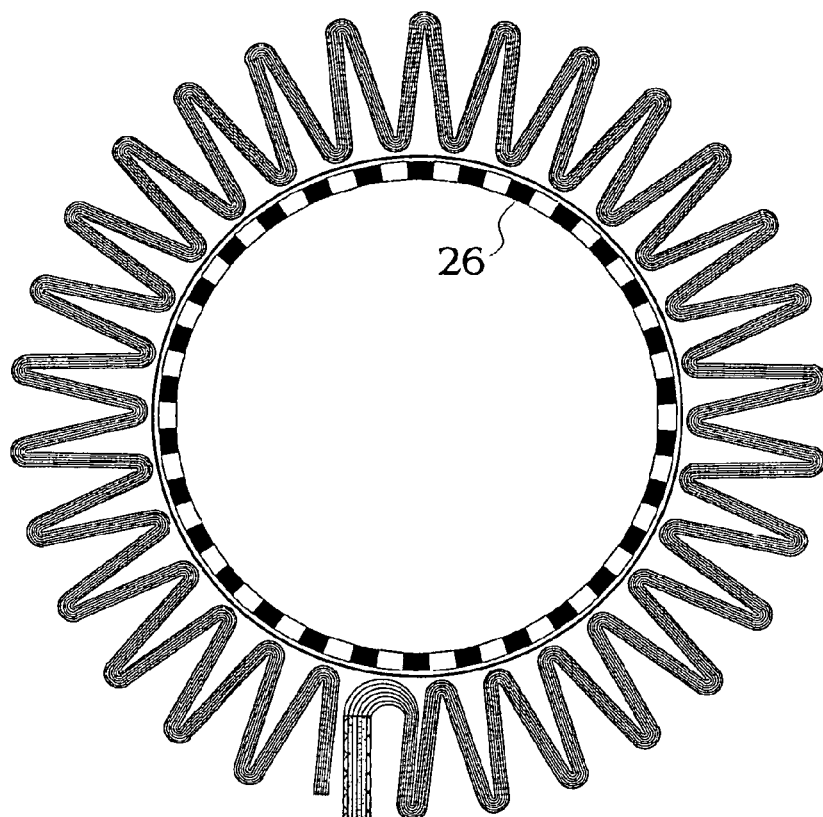
Figure 3
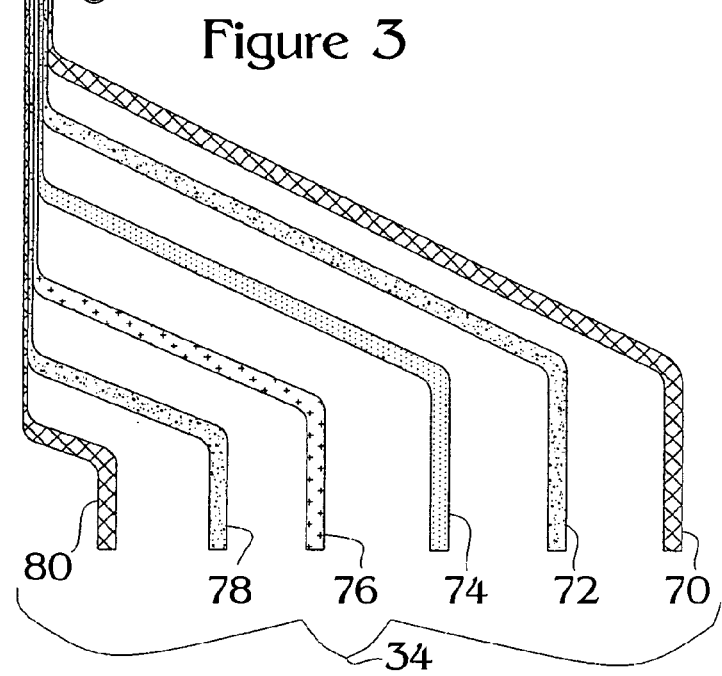

US 6,986,842 B2

FILTER ELEMENT WITH FOAM GIRDLE TO SECURE PLEATS AND METHOD OF FORMING SAME

RELATED APPLICATIONS

The present application is a continuation-in-part of U.S. application Ser. No. 10/257,171 filed Oct. 9, 2002 now abandoned, which is a national phase of PCT/US01/14352 filed May 3, 2001 which claimed the benefit of provisional patent application 60/203,553, filed May 11, 2000. The parent application was published as U.S.-2003-0047503 and is incorporated herein by reference in its entirety.

BACKGROUND OF THE INVENTION

1. Field of the Invention

The present invention relates to filter elements and, more particularly, to standard and coreless filter elements having pleated filters with a foam girdle to secure the pleats.

2. Brief Description of the Prior Art

Fluid systems often include an in-line filtration system for filtering out particles or other impurities in the fluid. The in-line filtration systems generally include a housing forming a hollow center chamber, a fluid inlet port, and a fluid outlet port. A replaceable filter element, usually forming a plurality of pleats, is positioned inside the hollow center chamber of the housing. An example of such a pleated element is disclosed in U.S. Pat. No. 3,552,553 to Redding. The fluid enters the inlet port of the filter, which is generally positioned at an outer edge of the housing, flows through the replaceable filter element, and exits the outlet port which is usually positioned adjacent a center portion of the housing.

One drawback of liquid or fluid filters having pleated filtering elements is that the spacing of each individual pleat can vary as the differential pressure of the fluid passing through the pleats is increased. Upon filtration of high viscosity oil, for example at cold start-up, the pleats may move toward one another causing bunching which restricts the flow of fluid flowing through the filter and also decreases the effectiveness of the filter. Pleat stability is not a significant concern in air filtrations systems such as disclosed in U.S. Pat. No. 5,858,044 to Nepsund.

One approach to overcoming this problem is disclosed in PCT application WO 97/31695. That application discloses using a spun-bonded support disposed within a cylindrical, internal cavity formed by a pleated filter element. Internal peaks of the filter element, formed by the pleats, are glued to the support wrap to increase the stability of the filter element and maintain separation of the pleats. One drawback of that approach is the manufacturing and material costs associated with accurately fixing the internal peaks of the pleats to the support wrap such that the pleats are evenly spaced.

SUMMARY OF THE INVENTION

The present invention provides a fluid filter element generally including a pleated filter media forming an external media surface comprised of the external pleat peaks with each filter pleat being fixed spaced apart from a neighboring pleat. A filter media sleeve is positioned adjacent the external media surface of the filter media, wherein the filter media sleeve is in contact with the external filter media surface and extend between the external pleat peaks to maintain the separation between each pleat. The pleated filter media for the fluid filter comprises at least an outer wire mesh layer, an adjacent outer scrim layer, at least one filter media layer, an inner scrim layer and an inner wire mesh layer.

The filter element according to the present invention may be manufactured by positioning the filter media sleeve adjacent to the external filter media surface and then compressing the filter media sleeve partially into indentations formed between each pleat of the filter media. The compression may be by sliding an outer support sleeve over the foam filter media sleeve, or by wrapping the outer support sleeve around the foam filter media sleeve. Alternatively, the filter media sleeves can be preformed with ridges and valleys that correspond to opposing ridges and valleys in the external filter media surface of the filter media.

These and other advantages of the present invention will be clarified in the description of the preferred embodiment taken together with the attached drawing.

BRIEF DESCRIPTION OF THE DRAWINGS

FIG. 3 is a schematic, partially enlarged exploded view of the pleated media of the fluid filter assembly according to the present invention.

DETAILED DESCRIPTION OF THE PREFERRED EMBODIMENTS

Figure 1:
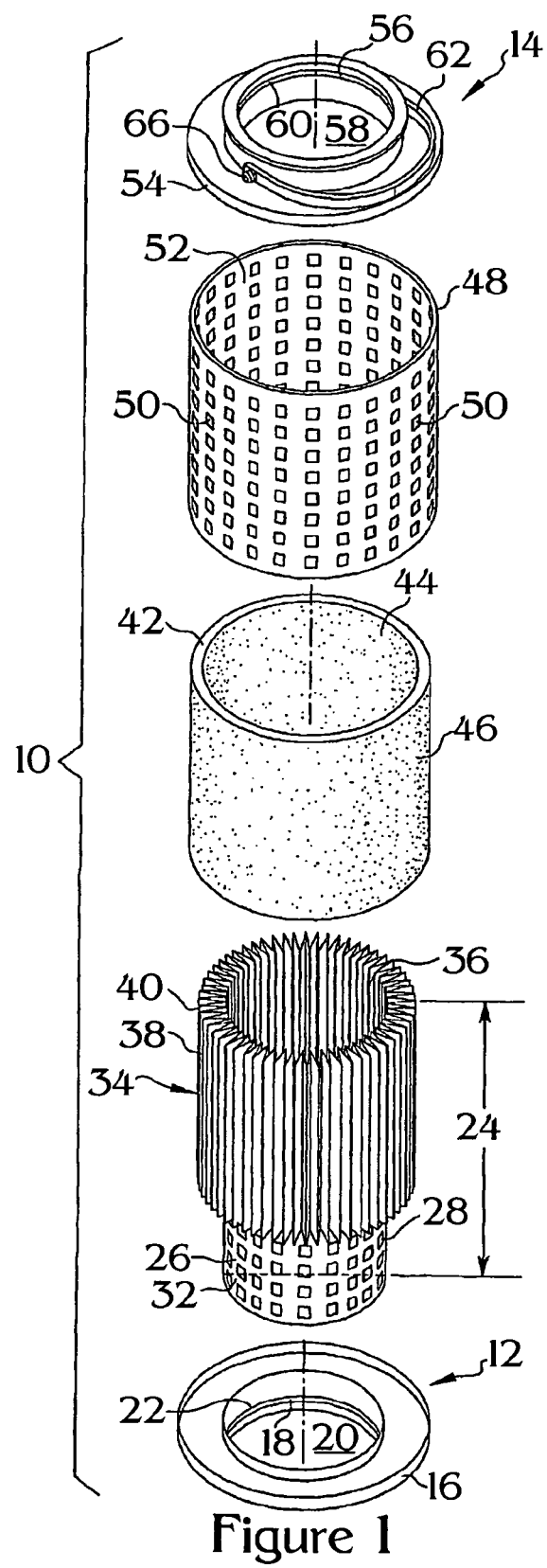
FIG. 1 is an exploded view of a fluid filter assembly according to one embodiment of the present invention.
Figure 2:
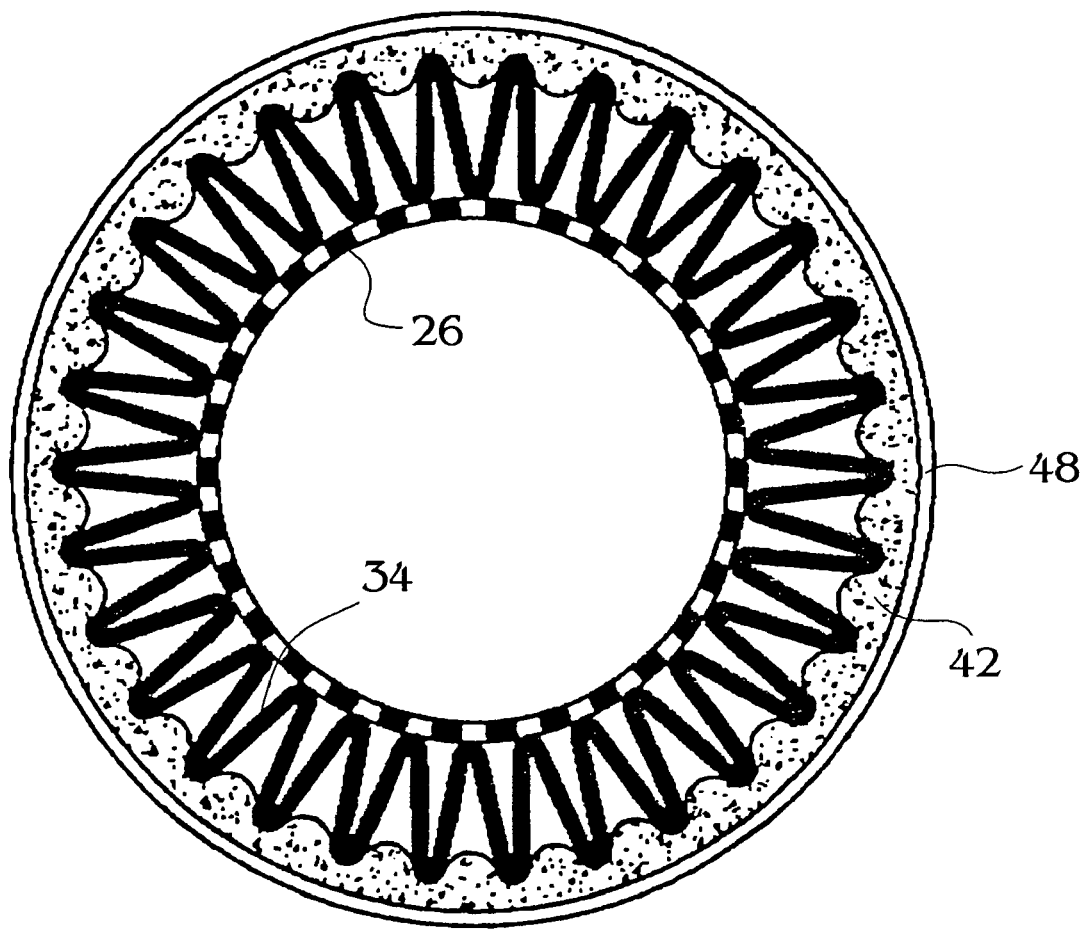
FIG. 2 is a plan view of the fluid filter assembly of FIG. 1.

The preferred embodiment of the present invention is generally shown in FIGS. 1–3 showing a fluid filter 10 having a first end 12 and a second end 14. The fluid filter 10 being specifically for fluids such as hydraulic and lubricating liquids (water, oil and the like). A first end cap 16 is positioned adjacent the first end 12 of the filter 10. The first end cap 16 is provided with a groove 18 in the interior surface of hollow cylindrical cavity 20. An O-ring 22 is received in the groove 18 of the first end cap 16.

A fluid filter assembly 24 is positioned adjacent the first end cap 16. The filter assembly 24 generally includes a hollow perforated tube 26 with perforations 28 formed there through, an internal tubing surface, an external tubing surface 32, and a pleated filter media 34. The tube 26 is preferably formed from polypropylene, nylon, or other suitable material. The hollow perforated tube 26 may be formed of metal or rigid plastic, as known in the art. The pleated filter media 34, having an internal filter media surface 36 comprising internal pleat peaks and an external filter media surface 38 comprising external pleat peaks, is positioned with the internal media surface 36 adjacent the external tube surface 32 of the tube 26. The internal filter media surface 36 and the external filter media surface 38 bound a plurality of individual pleats 40. The peaks of each pleat 40 are preferably spaced from peaks of a neighboring pleat 40 by a uniform distance. The pleated filter media 34, also called a pleat package, is preferably formed to include cellulose, glass, or other suitable filter media material as described below in connection with FIG. 3.

A filter media sleeve 42, having an internal sleeve surface 44 and an external sleeve surface 46, is positioned adjacent the external filter media surface 38 of the pleated filter media 34. The filter media sleeve 42 is preferably formed from reticulated flexible ether foam, approximately 0.16 cm to 2.5 cm thick T. However, the thickness can be increased or decreased depending on the size or application of the fluid filter 10. One such foam is sold under the SIF trademark and is available commercially from Foamex International Inc., 1000 Columbia Avenue, Linwood, Pa. 19061. It is a reticulated flexible polyurethane foam, characterized by a three-dimensional skeletal structure of strands which provide void space. With controlled pore sizes ranging from 1 pore per linear cm to 50 pores per linear cm, it offers uniformity.

The internal sleeve surface 44 of the filter media sleeve 42 is in direct physical contact with the external filter media surface 38 of the pleated filter media 34 and extends between the peaks of the pleats as shown in FIG. 2. A support sleeve 48, preferably formed from polypropylene, nylon, or other suitable material, may be used to hold the filter media sleeve 42 in constant contact with the external filter media surface 38 of pleated filter media 34. The support sleeve 48 is provided with a plurality of orifices 50 and an internal support sleeve surface 52. The support sleeve 48 may be slid over the filter media sleeve 42 to compress the foam of the filter media sleeve 42 between the peaks of the pleats as shown in FIG. 2. Alternatively the support sleeve may be an open sheet or member that is wrapped around the filter media sleeve 42, and then welded (e.g. ultrasonic welding) or otherwise secured to itself, wherein the wrapping of the member around the filter media sleeve 42 serving to compress the filter media sleeve 42 into a position between the peaks of the pleats, as shown.

A second end cap 54 is positioned adjacent the second end 14 of the filter 10 with the second end cap 54 provided with a groove 56 in the interior cylindrical surface in the hollow cylindrical cavity 58, wherein an O-ring 60 is received in the groove 56. The O-rings 22, 60 are preferably formed from rubber, synthetic rubber, nylon, or other suitable material. A handle 62 is attached to the second end cap 54 by pins 66.

As an alternative to the compression discussed above, the filter media sleeve 42 can be preformed with ridges and indentations that correspond to the external peaks of the pleats 40 of the pleated filter media 34. Alternatively, the filter media sleeve 42 can be wrapped around or positioned adjacent pleated filter media 34 and compressed by the support sleeve 48 partially into the spaces formed between the pleats 40 as noted above. Either arrangement is intended to position the foam between the peaks of the pleats to hold the spacing between the pleats under operational pressures for the fluid filter 10.

It has been found that positioning the filter media sleeve 42 in direct contact with the external surface of the pleated filter media 34 and extending between the peaks of the pleats, without any additional adhesive, keeps the pleats 40 from bunching together during flow of a liquid (e.g. oil, hydraulic fluid, other lubricating fluid) through the pleated filter media 34 at operational pressures. This anti-bunching effect helps prevent flow resistance exerted on the fluid during movement through the pleated filter media 34.

The description of the pleated filter media 34 in the fluid filter 10 may be beneficial. The pleated filter media 34 is shown in detail in FIG. 3. The external layer is a support structure in the form of an outer wire mesh 70. The wire mesh 70 may be a plastic mesh or an epoxy coated carbon wire mesh, or even a stainless steel mesh. An upstream scrim layer 72 is adjacent the outer wire mesh and serves to protect the fragile media and distribute the force of the wire mesh 70. The scrim layer 72 is typically a polyester or nylon type layer. Adjacent the scrim layer 72 is the media layers 74 and 76. Any number of media layers may be utilized in the fluid filter 10 depending upon the specific application, typically from 1–10 layers. In the specific embodiment shown, media layer 74 is a dirt holding layer and media layer 76 is known as an efficiency layer. The media layers 74 and 76 are typically glass or cellulose; however other suitable filter media material may be used. The media layers 74 and 76 if formed of glass fibers or the like, are fragile, and can break down with repeated bending or flexing. Adjacent the media layers 74 and 76 is an inner scrim layer 78 and an inner mesh layer 80. Scrim layer 78 and wire mesh 80 operate and are formed in a similar manner as scrim layer 72 and mesh 70 discussed above. The scrim layer 72, media layers 74 and 76 and the scrim layer 78 may also be formed as an integrated co-pleated structure between the wire meshes 70 and 80.

The forces involved with a fluid filter 10 are relatively high, compared with air filtration, and it is these high forces that act to move and damage the fragile pleated media in prior art pleated media fluid filter systems. The foam girdle extending between the peaks of the pleats in the present system stabilize the pleats in the fluid system and avoid pleat movement. The above description is intended to be representative of the present invention and not restrictive thereof. It will be apparent to those of ordinary skill in the art that various modifications may be made to the present described invention without departing from the spirit and scope of the present invention. Therefore, having thus described our invention with the detail and particularity required by the Patent Laws, what is desired protected by Letters Patent is set forth in the following claims and equivalents thereto.

What is claimed is:

1. A fluid filter element comprising:
   a pleated filter media having spaced apart pleats and an external filter media surface comprising the external peaks of the pleats, wherein the pleated filter media includes at least one media layer between wire meshes;
   a foam filter media sleeve having a cylindrical inner surface in contact with the external filter media surface, and extending at least partially into the spaces between the peaks of the pleats, wherein the filter media sleeve maintains the space between the external peaks of the pleats of the filter media; and
   a support sleeve in contact with the flexible foam filter media.

2. The fluid filter element as claimed in claim 1 wherein the pleated filter media includes an upstream scrim layer and a downstream scrim layer, each positioned between the at least one media layer and one of the wire meshes.

3. The fluid filter element of claim 2 wherein pleated filter media includes a plurality of media layers formed of glass fiber media.

4. The fluid filter element of claim 3 wherein the support sleeve compresses the foam filter sleeve between the peaks of the pleats of the pleated filter media.

5. The fluid filter element of claim 4 wherein the support sleeve includes a weld seam along a length thereof.

6. The fluid filter element of claim 3 wherein the pleated media is preformed with ridges and indentations that correspond to the external peaks of the pleats of the pleated filter media.

7. The fluid filter element of claim 1 further including a cylindrical rigid center tube surrounded by the pleated filter media.

8. The fluid filter element as claimed in claim 7 wherein the pleated filter media includes an upstream scrim layer, a plurality of the media layers formed of glass fiber media, and a downstream scrim layer, each scrim layer positioned between the media layers and one of the wire meshes.

9. The fluid filter element of claim 3 wherein the pleated media is preformed with ridges and indentations that correspond to the external peaks of the pleats of the pleated filter media.

10. A method of making a pleated fluid filter element comprising:
arranging a pleated filter media into a cylindrical shape having external pleat peaks and internal pleat peaks, wherein the pleated filter media includes at least one media layer between wire meshes;
placing a foam filter media sleeve having a cylindrical surface in contact with the external pleat peaks and extending at least partially into the spaces between the peaks of the pleats such that the spacing between the external peaks of the pleats of the filter media is maintained; and
placing an outer support sleeve in contact with the flexible foam filter.

11. The method of making a pleated fluid filter element of claim 10 wherein the pleated filter media includes an upstream scrim layer, a plurality of the media layers formed of glass fiber media, and a downstream scrim layer, each scrim layer positioned between the media layers and one of the wire meshes.

12. The method of making a pleated fluid filter element of claim 11 further comprising the step of compressing the foam filter media sleeve when the outer support sleeve is place into contact therewith, said compression having the foam filter media sleeve be compressed into the spaces between the peaks of the pleats.

13. The method of making a pleated fluid filter element of claim 12 wherein the compressing is by wrapping the support sleeve around the foam filter media sleeve.

14. The method of making a pleated fluid filter element of claim 13 further comprising the step of securing the support sleeve to itself after wrapping around the foam filter media.

15. The method of making a pleated fluid filter element of claim 14 wherein the securing of the support sleeve is by ultra sonic welding.

16. The method of making a pleated fluid filter element of claim 12 wherein the compression is by sliding the cylindrical support sleeve over the flexible foam filter media for compressing the flexible foam filter media into the spaces between the peaks of the pleats.

17. A fluid filter element comprising:
A) an inner rigid perforated elongated cylindrical center tube;
B) a pleat package surrounding the center tube, the pleat package having spaced apart pleats, wherein the pleat package includes
  i) an inner wire mesh,
  ii) an inner scrim layer adjacent the inner wire mesh,
  iii) at least one media layer adjacent the inner scrim layer,
  iv) an outer scrim layer adjacent the at least one media layer, and
  v) an outer wire mesh; and
C) a foam filter media sleeve having a cylindrical inner surface in contact with the outer wire mesh of the pleat package and extending at least partially into the spaces between the peaks of the pleats of the pleat package, wherein the filter media sleeve maintains the space between the external peaks of the pleats of the pleat package.

18. The fluid filter element of claim 17 further including a cylindrical rigid center tube surrounded by the pleated filter media and wherein pleated filter media includes a plurality of media layers formed of glass fiber media.

19. The fluid filter element of claim 17 further including a support sleeve in contact with the flexible foam filter media, wherein the support sleeve compresses the foam filter sleeve between the peaks of the pleats of the pleated filter media.

20. The fluid filter element of claim 19 wherein the support sleeve includes a weld seam along a length thereof.

* * * * *